W. BOSS.
GRASS CATCHER.
APPLICATION FILED FEB. 15, 1913.
1,136,207.
Patented Apr. 20, 1915.
2 SHEETS—SHEET 1.
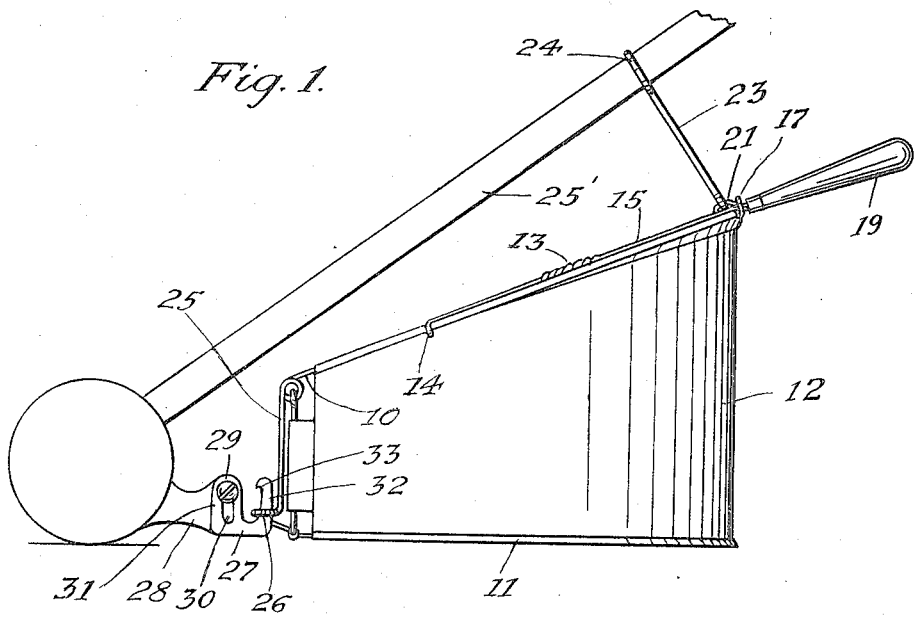
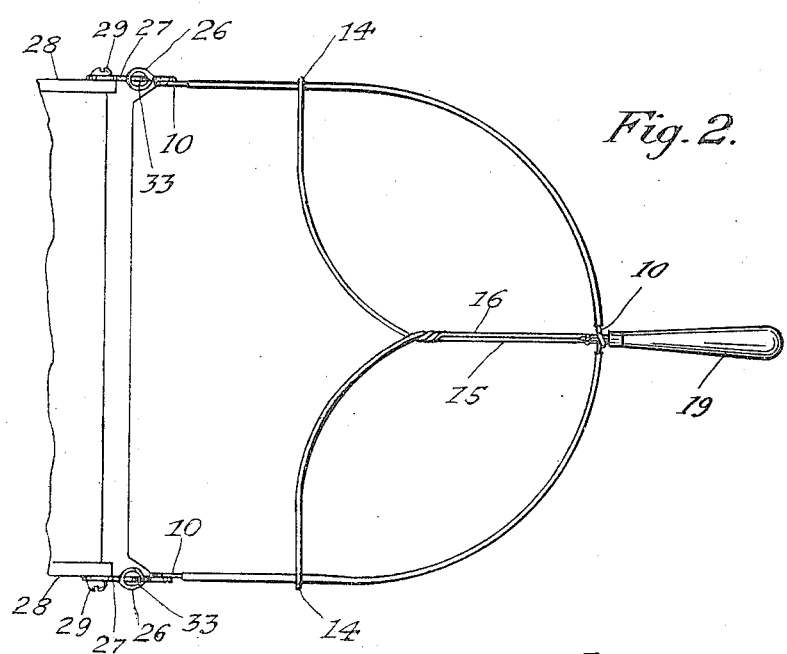
Witnesses:
Theo Lagaard
H. A. Bowman
Inventor:
William Boss.
By F. O. Whiteley
his Attorney.

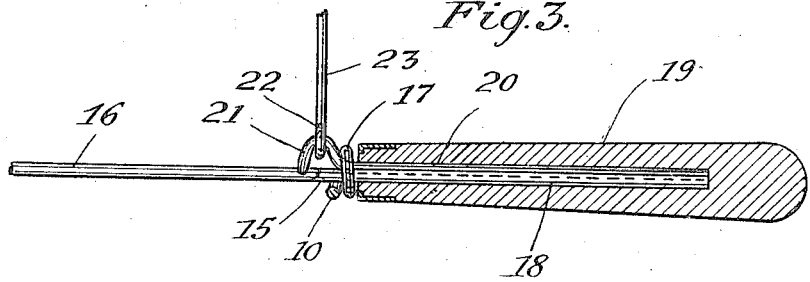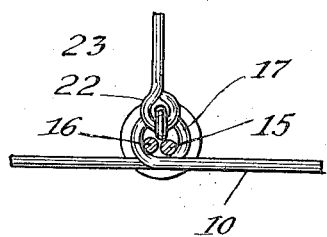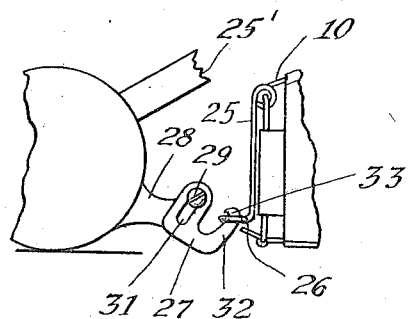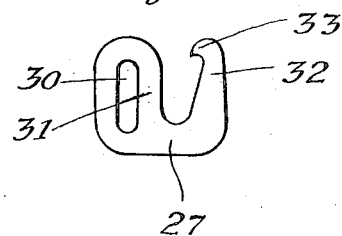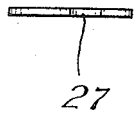

UNITED STATES PATENT OFFICE.

WILLIAM BOSS, OF ST. PAUL, MINNESOTA.

GRASS-CATCHER.

1,136,207.　　　　Specification of Letters Patent.　　Patented Apr. 20, 1915.

Application filed February 15, 1913.　Serial No. 748,750.

*To all whom it may concern:*

Be it known that I, WILLIAM BOSS, a citizen of the United States, residing at St. Paul, in the county of Ramsey and State of Minnesota, have invented certain new and useful Improvements in Grass-Catchers, of which the following is a specification.

My invention relates to grass catchers of the type which are easily attachable to and may also be easily lifted off from lawn mowers, and particularly to the means for attaching the handle and related parts to the body of the catcher.

A further object of my invention is to provide a new and improved means of attaching the front end of the grass catcher to the lawn mower such as to permit ready adjustment of the same to different types of mowers.

The full objects and advantages of my invention will appear in connection with the detailed description thereof and are particularly pointed out in the claims.

In the drawings, illustrating the application of my invention in one form, Figure 1 is a side elevation view of a grass catcher embodying my improvements. Fig. 2 is a plan view. Figs. 3 and 4 are sectional details. Fig. 5 is a view showing the hook attaching device in a different position. Figs. 6 and 7 are detail views of the hook attaching member.

As shown, a wire frame 10, metal bottom 11, and connecting canvas body portion 12 are of a structure similar to that employed in my Patent Number 1,039,355, as in the structure of that patent I employ a wire handle which is intermediately brought together at 13 to form a hand-hold and has side hooks 14 for engaging the frame 10. This handle is not, however, composed of a single piece of wire with a central hook extending over the back of the frame as in my said patent but comprises two pieces of wire 15 and 16 which extend from the intertwisted portion 13 in parallel relation through a loop 17 formed at the back portion of the frame wire 10 and into a socket 18 formed in a short outer handle 19 which may be of wood or other material. Or the portion which extends through loop 17 and into the socket 18 may be an elongated bend or loop of a single wire from which the top frame 10 is constructed.

After the handle 19 has been assembled upon the wires 15 and 16 of the inner handle, a short section 20 having thereon a hooked end 21 which passes through an eye 22 on an arm 23 is driven through the loop 17 and into the socket 18 in a position upon and relatively between the wires 15 and 16. This wire section 20 acts as a key rigidly wedging the handle 19 upon the extended ends of the wires 15 and 16 locking said wires in fixed position within the loop 17 and providing means of pivotal attachment for the arm 23 which comprises a hook 24 by which the grass catcher is movably attached to the handle-bar 25' of the lawn mower.

The frame 10 has formed upon the front of each end thereof at the sides of the lawn mower attached spring members 25 which extend downwardly and are provided with a horizontal loop 26. Hooks 27, of the form shown in Figs. 1 and 6, are secured to the frame 28 of the lawn mower by means of a single bolt 29 extending through an elongated slot 30 in body portions 31 of said hooks. In addition to the body portions 31 having therein the slots 30, the hooks 27 are provided with an upstanding arm-like portion 32 having thereon an inwardly projecting secondary hook 33. This arrangement makes it possible not only to adjust the hook bodily in a vertical direction by means of the slot and bolt connection but also to swivel the hook, as shown in Fig. 5, so as to cause the grass catcher to be drawn nearer to the frame of the lawn mower than could be the case except for this swiveling action, the secondary hook 33 preventing the withdrawal of loop 26. By means of this adjustable attaching device it is possible to make the grass catcher fit properly all usual styles and sizes of lawn mowers on the market.

The simplicity and advantages of this construction will be obvious. My grass catcher combines the advantages of those grass catchers having a handle extending rearwardly from the body of the grass catcher and those in which a wire reinforcing handle is attached in three points to the top wire of the catcher frame. The arrangement shown also provides a particularly strong and effective means for attaching the arm for supporting the catcher from the mower handle.

I claim:

1. A grass catcher comprising a wire top frame formed with an integral wire loop at the back thereof, and a wire handle having diverging arms secured to the sides of said frame and a portion extending through said loop to the rear of the frame and providing a rearwardly extending handle portion.

2. A grass catcher comprising a wire top frame formed with a loop at the back thereof, a wire handle having diverging arms secured to the sides of said frame and a portion extending through said loop to the rear of the frame, a wooden handle upon said rearwardly extended portion of the wire handles, a wire key extending through said loop and wedging the wooden handle upon said rearwardly extended portions, said key comprising a hooked end turned toward the wire handle, and a hooked arm pivotally connected with said hooked end for removably securing the grass catcher to the handle-bar of a lawn mower.

3. A grass catcher comprising a wire top frame formed with an integral wire loop at the central portion of the back thereof, a wire handle having diverging arms secured to the sides of said frame, and a portion extending through said loop a required distance to the rear of the frame, a wire key extending through said loop and engaging the wires of the handle so as to secure the same rigidly within said loop, and a hollow gripping member secured upon said rearwardly extended portion of the wire handle by means of said wire key.

In testimony whereof I affix my signature in presence of two witnesses.

WILLIAM BOSS.

Witnesses:
  F. A. WHITELEY,
  H. A. BOWMAN.

Copies of this patent may be obtained for five cents each, by addressing the "Commissioner of Patents, Washington, D. C."